United States Patent [19]

Kugimiya et al.

[11] Patent Number: 5,005,127

[45] Date of Patent: Apr. 2, 1991

[54] SYSTEM INCLUDING MEANS TO TRANSLATE ONLY SELECTED PORTIONS OF AN INPUT SENTENCE AND MEANS TO TRANSLATE SELECTED PORTIONS ACCORDING TO DISTINCT RULES

[75] Inventors: Shuzo Kugimiya; Yoji Fukumochi; Ichiko Nakamura, all of Nara; Tokuyuki Hirai, Yamatokoriyama; Hitoshi Suzuki, Nara, all of Japan

[73] Assignee: Sharp Kabushiki Kaisha, Osaka, Japan

[21] Appl. No.: 262,313

[22] Filed: Oct. 25, 1988

[30] Foreign Application Priority Data

Oct. 26, 1987 [JP] Japan .................. 62-271287
Oct. 28, 1987 [JP] Japan .................. 62-272638

[51] Int. Cl.$^5$ .............................. G06F 15/38
[52] U.S. Cl. .................... 364/419; 364/200; 364/900
[58] Field of Search ............ 364/419, 200, 900

[56] References Cited

U.S. PATENT DOCUMENTS 4,787,038 11/1988 Doi et al. ............... 364/419
4,791,587 12/1988 Doi .......................... 364/419

FOREIGN PATENT DOCUMENTS 0244871 5/1987 European Pat. Off. .
2131582 6/1984 United Kingdom .
2131583 6/1984 United Kingdom .
2193358 2/1988 United Kingdom .
2193362 2/1988 United Kingdom .
2199170 6/1988 United Kingdom .

*Primary Examiner*—Allen R. MacDonald
*Assistant Examiner*—Gail O. Hayes

[57] ABSTRACT

A machine translation apparatus includes a morpheme analyzer having a dictionary for analyzing a source sentence into morphemes and for obtaining part of speech and other information using the dictionary, a syntax analyzer having grammatical rules for analyzing the structure of the morphemes identified by the morpheme analyzer using the dictionary and grammatical rules, a convertor for converting the structure obtained by the syntax analyzer to a structure of the target language, and a translated sentence generator for generating a translated sentence according to the structure of the target language obtained by the convertor. The translation apparatus further includes a marker entry for entering a no-conversion start marker and a no-conversion end marker in the input sentence, so that during the generation of the target language, the words between the no-conversion start and end markers are developed without being translated. Furthermore, a distinct translation phrase marker is used to separate the entered source sentence, so that the translation can be separately carried out between the separated sections.

2 Claims, 9 Drawing Sheets

INPUT: It is developped in {{the Temperature and Pressure Test, Section 37}} .

OUTPUT: それは、the Temperature and Pressure Test, Section 37 で開発される。

Fig. 8
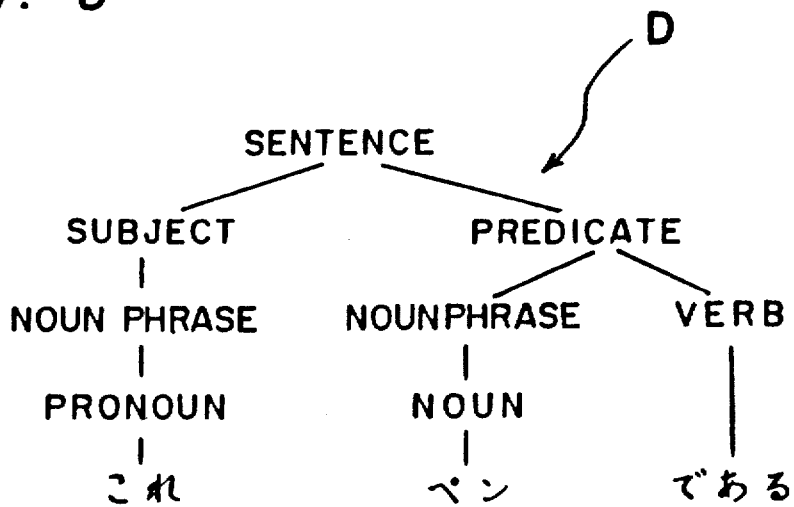
Fig. 9
Fig. 10
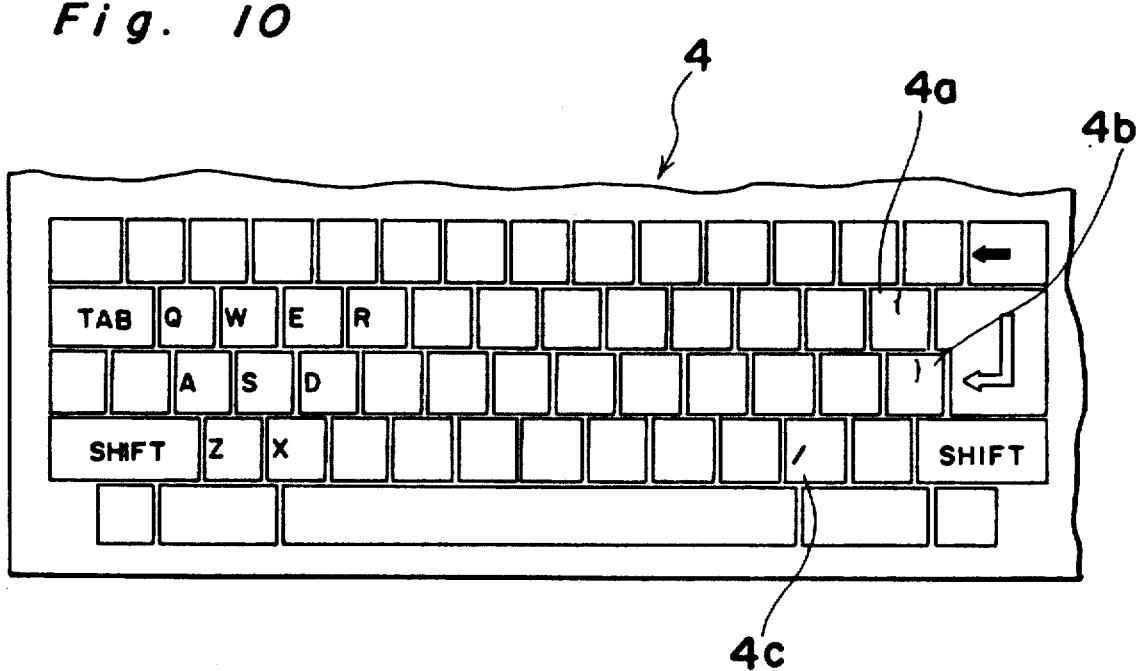

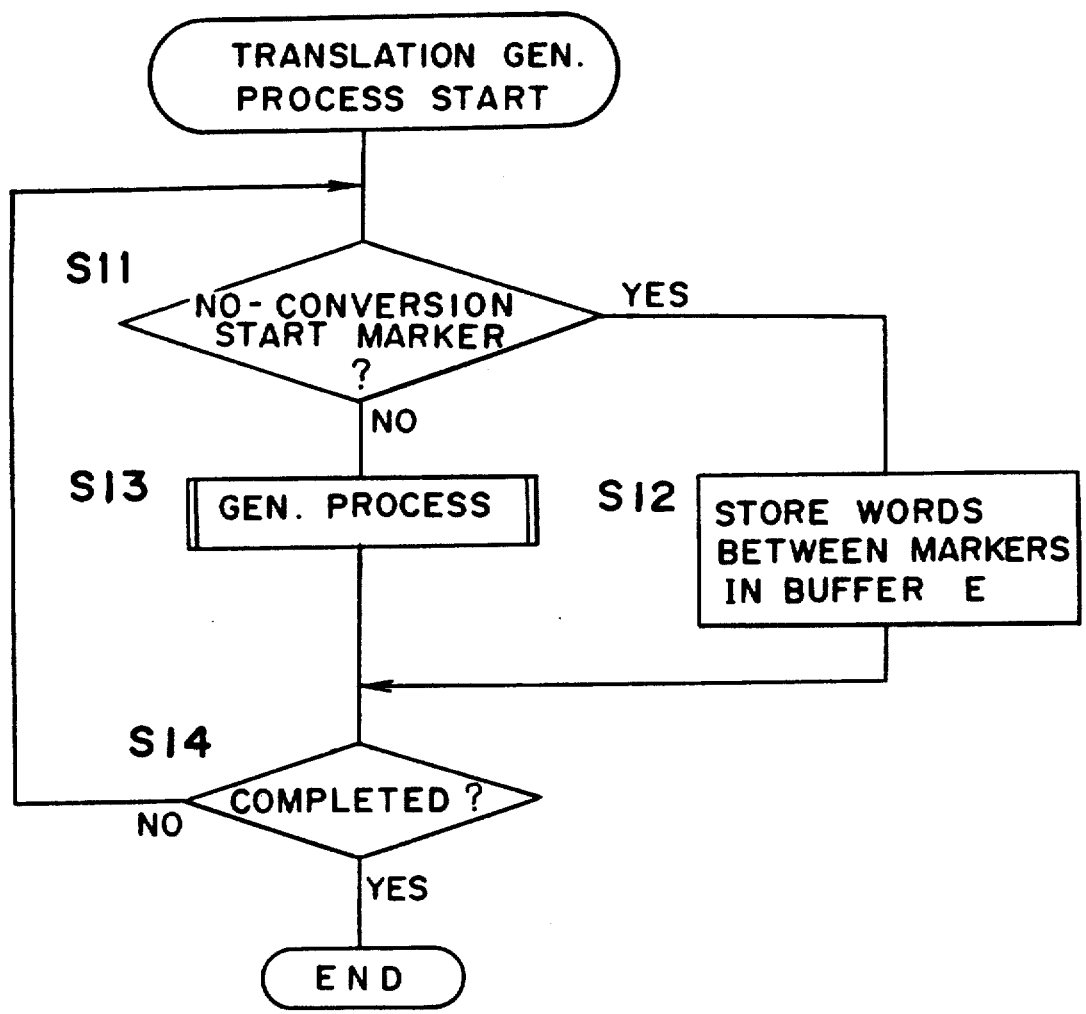

SYSTEM INCLUDING MEANS TO TRANSLATE ONLY SELECTED PORTIONS OF AN INPUT SENTENCE AND MEANS TO TRANSLATE SELECTED PORTIONS ACCORDING TO DISTINCT RULES

BACKGROUND OF THE INVENTION

1. Field of the Invention

The present invention relates to a machine translation apparatus which can output into the translated text any desired part of the source text without conversion to the target language, and also which can separate and translate any selected grammatical constructions in the source text.

2. Description of the Prior Art

A machine translation apparatus as is known from the prior art is described as follows. A conventional machine translation apparatus inputs the source language text entered from a keyboard into a translation module as controlled by a main CPU, and the input source text is translated into the target language using dictionaries, grammatical rules, and tree structure conversion rules stored in the buffer of the translation module When a translation is attempted using a machine translation apparatus according to the prior art as hereinbefore described, excessive time is required for translation and said translation often fails when there are numerical expressions included in the source text which must be output in the target language as they appear in the source text because morphological analysis of each element in the numerical expression is executed. Processing is therefore required to pre-delete numerical expressions, thereby increasing the work load on the user. Another problem is that even when a non-numerical selected part of the source text must be output in the translated text as it appears in the original, said selected part is still automatically translated.

Furthermore, when a translation is attempted using a machine translation apparatus according to the prior art as hereinbefore described, the syntax of the original source text is determined according to grammatical rules stored in a buffer. In the event the grammatical rules are not applicable to a specific construction in the original, the original may be misinterpreted and a translation may not be possible. Furthermore, even if the grammatical rules are applicable to a specific construction in the original, misinterpretations may easily occur with sentences in which relationships are extremely complex. Moreover, when long sentences with complex relationships are entered, the processing time increases proportional to the length of the sentence.

SUMMARY OF THE INVENTION

The present invention has been developed with a view to substantially solving the above described disadvantages and has for its essential object to provide a machine translation apparatus which specifies by means of markers any desired part of the entered source text for no-conversion, and thereby enables text marked for no-conversion in the source language to be output quickly and correctly in the translated text as it appears in the source text.

Furthermore, another object of the present invention is to provide a translation machine which enables correct and high speed interpretation of the source text even in the event that grammatical rules are not applicable to a specific construction and even in the event original texts with complex relationships are input by applying distinct translation phrase markers around any desired constructions in the original and thus enabling separate translation of only those constructions.

In accomplishing these and other objects, a machine translation apparatus according to a preferred embodiment of the present invention includes: a morpheme analyzer having a dictionary for analyzing a source sentence into morphemes and for obtaining part of speech and other information using said dictionary. There is a syntax analyzer having grammatical rules for analyzing the structure of the morphemes identified by said morpheme analyzer using the dictionary and grammatical rules. Also included is a convertor for converting the structure obtained by said syntax analyzer to a structure of the target language and a translated sentence generator for generating a translated sentence according to the structure of the target language obtained by said convertor. A marker entry means is used for entering a no-conversion start marker and a no-conversion end marker in said input sentence. There is a marker identification means for identifying whether or not the read by the marker means data is either one of the no-conversion start marker or the no-conversion end marker. A morpheme skip means for skipping, when said marker identification means identifies said read data to be a no-conversion start marker, the dictionary referencing for all morphemes between the no-conversion start and end markers; morpheme storing means for storing said morphemes between said no-conversion start and end markers, and adding data identifying said morphemes as a noun compound during dictionary look-up processing of said morpheme analyzer; a generation skip means for skipping, when said marker identification means identifies the read data to be a no-conversion start marker, the translation generation for all morphemes between the no-conversion start and end markers; and translation generation storing means for storing said morphemes in the same form as they appear in the source language during a translation generation processing in said translated sentence generator.

A machine translation apparatus according to another preferred embodiment of the invention includes a morpheme analyzer as described above a syntax analyzer having grammatical rules including distinct phase translation rules for analyzing the structure of the morphemes identified by said morpheme analyzer using said dictionary and grammatical rules. Therein a convertor for converting the structure obtained by said syntax analyzer to a structure of the target language; a translated sentence generator for generating a translated sentence according to the structure of the target language obtained by said convertor. A marker entry means is used for entering a distinct translation phrase marker to separate said entered source sentence; a marker detecting means for detecting said distinct translation phrase marker contained in the entered source sentence; and a grammatical rule enabling means for enabling the use of said distinct phrase translation rules when said marker detecting means detects said distinct translation phrase marker.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which:

FIGS. 5, 6, 7, 8 and 9 are diagrams showing the contents of each buffer shown in FIG. 4;

FIG. 10 is a detailed top plan view of the key board shown in FIG. 1;

FIG. 12 is a flow chart showing the translation generation process;

FIG. 13 is a diagram showing the display of the source language and the translated language;

DETAILED DESCRIPTION OF THE PREFERRED EMBODIMENTS

Figure 1:
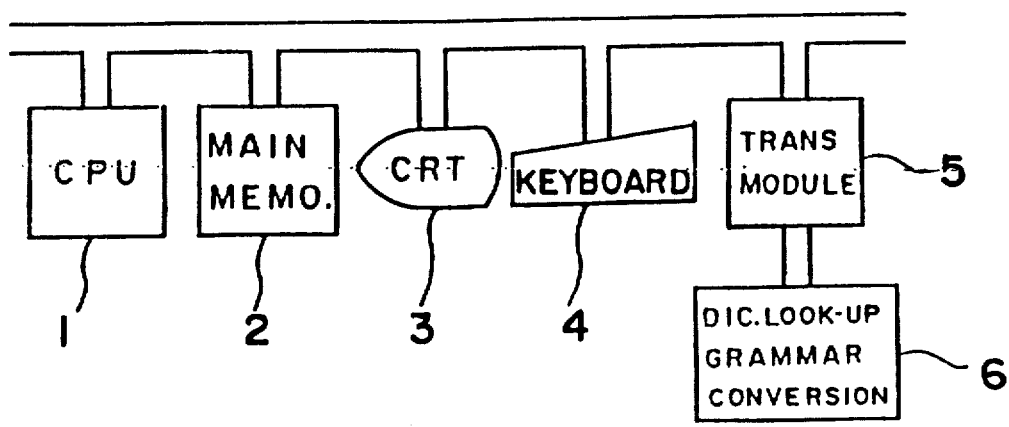
FIG. 1 is a block diagram of a preferred embodiment of a machine translation apparatus according to the present invention.

Referring to FIG. 1 a block diagram of a machine translation apparatus according to the present invention is shown. Reference numeral 1 is a main CPU (central processing unit), 2 is a main memory, 3 is a CRT 3 (cathode ray tube), 4 is a keyboard, 5 is a translation module, and 6 is a memory device storing dictionaries, grammatical rules, and tree structure conversion rules for translation.

When the source language text is input to the aforementioned translation module 5, translation module 5 translates this, and outputs the target language. Specifically, the source language entered from keyboard 4 is sent to translation module 5 as controlled by main CPU 1. Translation module 5 translates the input source language to the target language as will be described hereinafter using the dictionaries, grammatical rules, and tree structure conversion rules stored in memory 6. The result of this translation is temporarily stored in main memory 2 and is displayed on CRT 3.

Figure 2:
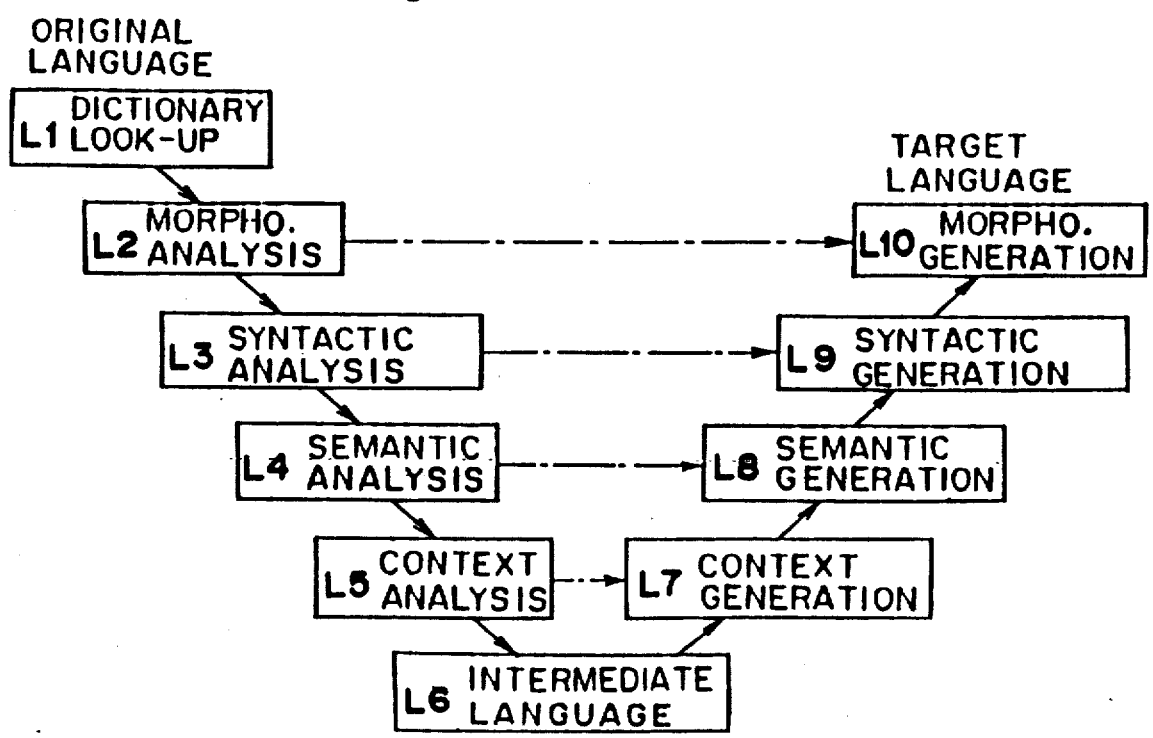
FIG. 2 is an explanatory diagram of the translation levels in automatic translation.

Automatic translation such as performed by translation module 5 generally consists of the analytical levels shown in FIG. 2. When the source language is input as shown at the top left of the figure, analysis progresses through level L1 dictionary referencing, level L2 morpheme analysis, level L3 grammatical construction, or syntactic, analysis, and so on.

Machine translation can be broadly divided into two major types according to these analytical levels. One is the pivot method in which sentences are analyzed through level L6 to obtain an intermediate language which is neither the source language nor the target language. Analysis then proceeds through level L7 context generation, level L8 semantic generation, level L9 syntactic generation, and to level 10 morpheme generation, where the target language is generated.

The other is the transfer method in which the aforementioned level L2 morpheme analysis, level L3 grammatical construction analysis, level L4 semantic analysis, and level L5 context analysis are performed to obtain the internal syntax of the source language text. Next, the target language is generated after the internal syntax of the source language text is converted to the internal syntax of the target language text at the same level.

The aforementioned analysis is explained below.

* Dictionary referencing and morpheme analysis

The dictionaries of memory 6 in FIG. 1 are referenced to break the input sentence into discrete morpheme strings (word strings), to obtain part of speech and other grammatical information and word equivalents for individual morphemes, and to analyze tense, person, and number.

* Syntactical analysis

As will be described later, the structure (syntax analysis tree) of the sentence, including relationships between words, is determined.

* Semantic analysis

Semantically correct constructions are inferred and constructed from the results of multiple syntactical analyses.

* Context analysis

The topic of the sentence is inferred, and abbreviations and ambiguities are clarified.

Figure 3:
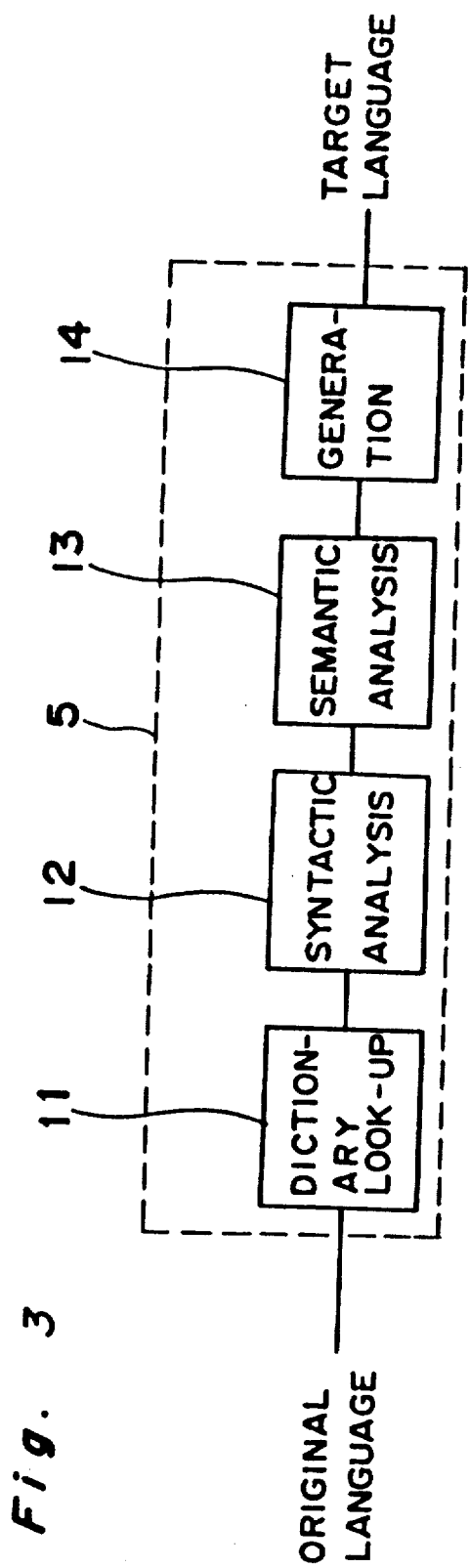
FIG. 3 is an operating structure diagram of the translation module according to the aforementioned preferred embodiment.

Translation module 5 used in the present invention shall, at the minimum, analyze the input sentence through level L3 syntactical analysis Specifically, translation module 5 in the preferred embodiment shall be thought of as a translation module consisting of the parts as shown in FIG. 3.

Figure 4:
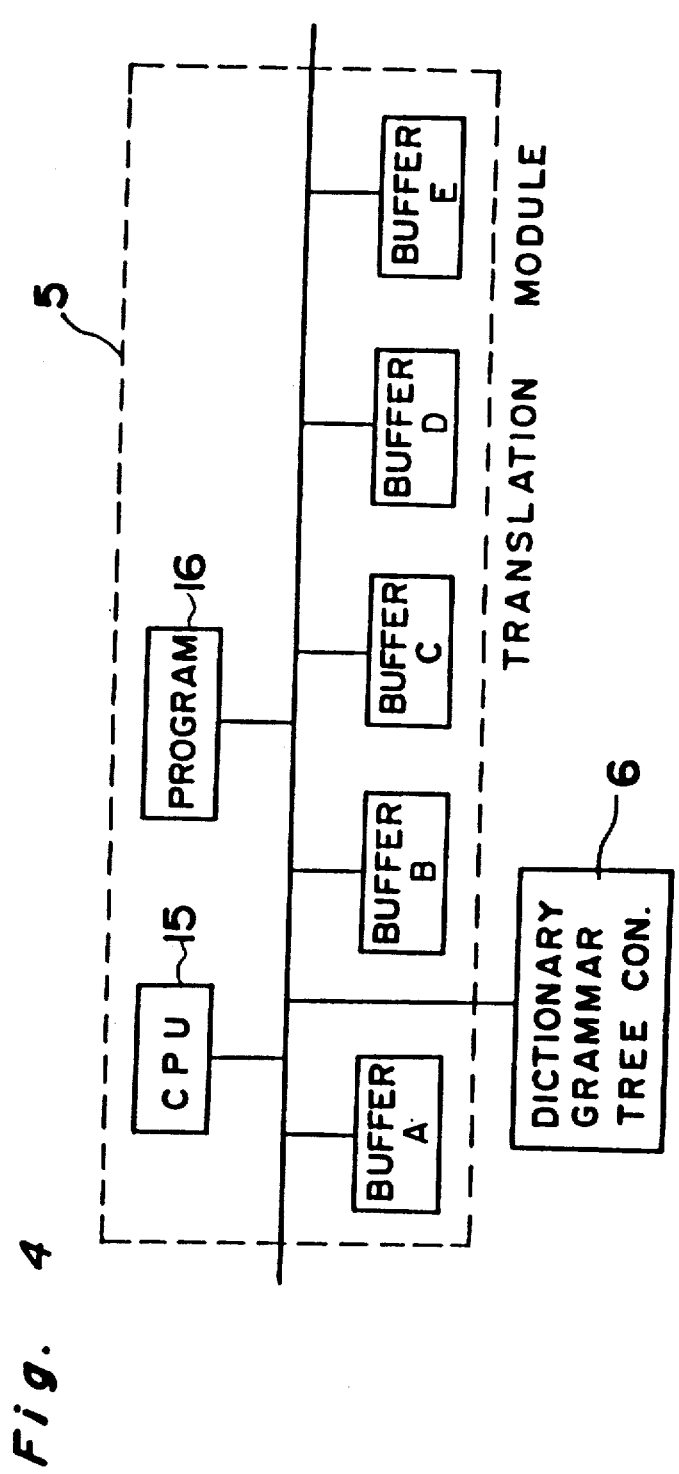
FIG. 4 is a block diagram of the aforementioned translation module.

Referring to FIG. 4, a block diagram of the aforementioned translation module 5 is shown. Furthermore, FIGS. 5 through 9 show the contents of buffers A through E shown in FIG. 4 during translation of the English sentence "This is a pen." to an equivalent Japanese sentence Operation during English-Japanese translation is described with reference to FIG. 3 through FIG. 9.

Figure 5:
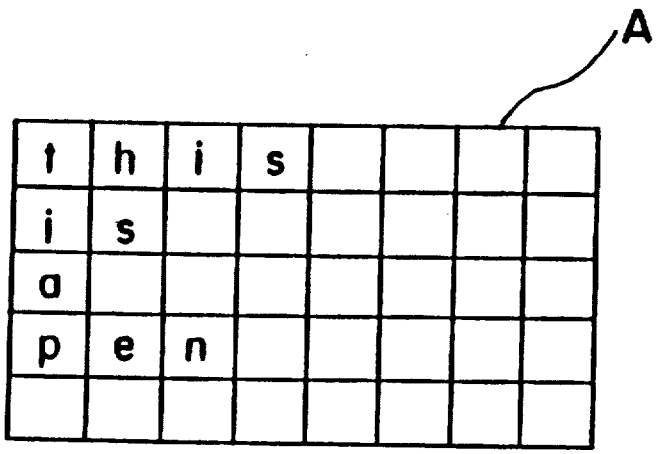
Figure 6:
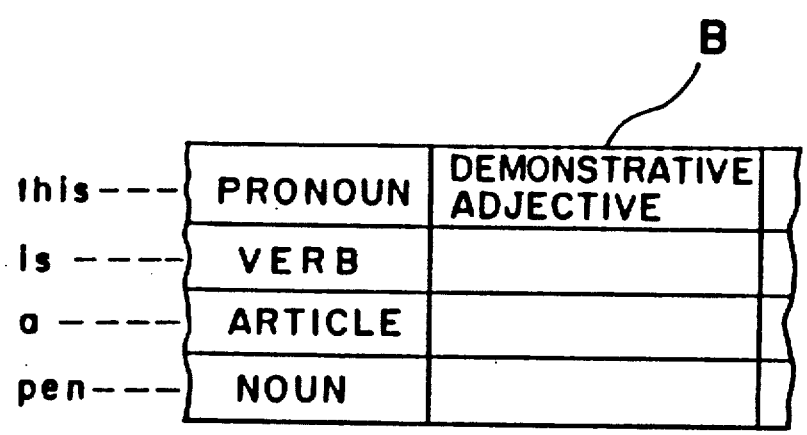
Figure 7:
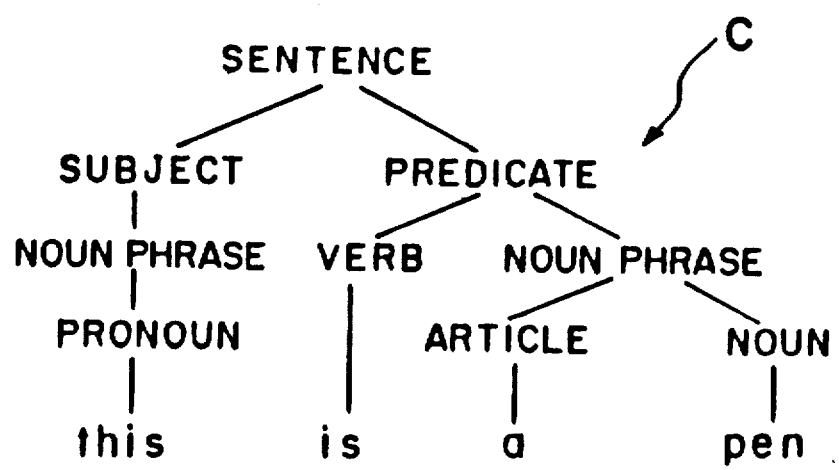

First, the original is stored in a manner shown in FIG. 5 in buffer A. As controlled by translation CPU 15 according to translation program 16, the information required for each word is obtained by dictionary-referencing morpheme analyzer 11 shown in FIG. 3 using the dictionaries in memory 6 according to the original text stored in buffer A, and this information is then stored in buffer B. For example, the part of speech information, which is a part of the aforementioned required information, is stored as shown in FIG. 6. In the example shown, "this" has multiple parts of speech, a single meaning is inferred by syntax analyzer 12 shown in FIG. 3. Syntax analyzer 12 determines the syntax analysis tree, shown in FIG. 7, which shows the relationship between individual words as defined by the dictionaries and grammatical rules in memory 6, and this syntax analysis tree is stored in buffer C. This syntax analysis tree is determined as follows, wherein specifically the grammatical rules in memory 6 state as shown in Table 1.

Table 1

Sentence→subject, predicate
Subject→noun phrase
Predicate→verb, noun phrase
Noun phrase→pronoun
Noun phrase→article, noun For example, the first rule states that "a sentence consists of a subject and predicate." In the following description, the syntax analysis tree is determined according to these rules.

The convertor 13 shown in FIG. 3 converts the structure of the syntax analysis tree (see FIG. 7) for the source English sentence to the structure of the Japanese sentence as shown in FIG. 8 using the tree structure conversion rules in memory 6 in the same way the original tree was constructed by the aforementioned syntax analyzer. The result is then stored in buffer D of FIG. 4. Translated sentence generator 14 in FIG. 3 applies the postpositional article "WA" and auxiliary verbs appropriate to the obtained Japanese words "KORE PEN DE ARU," and outputs the result as shown in FIG. 9 to be stored in buffer E of FIG. 4. This Japanese sentence "KORE WA PEN DE ARU" is output from translation module 5, and stored in main memory 2 and displayed on CRT 3.

In the above described translation processing operation, the source language text is separated into individual morphemes (words) by dictionary-referencing morpheme analyzer 11, and grammatical information such as parts of speech is obtained by referencing the dictionaries. If at this time a no-conversion start marker is detected, dictionary referencing is skipped for all morphemes up to the no-conversion end marker. The no-conversion start marker and the no-conversion end marker according to this embodiment is defined by double opening braces "{{" and double closing braces "}}", respectively, which are input during the input of source language text by using keys 4a and 4b (FIG. 10), each key being depressed twice.

The dictionary look-up process of dictionary-referencing morpheme analyzer 11 is described below with reference to the flow chart of FIG. 11.

Figure 11:
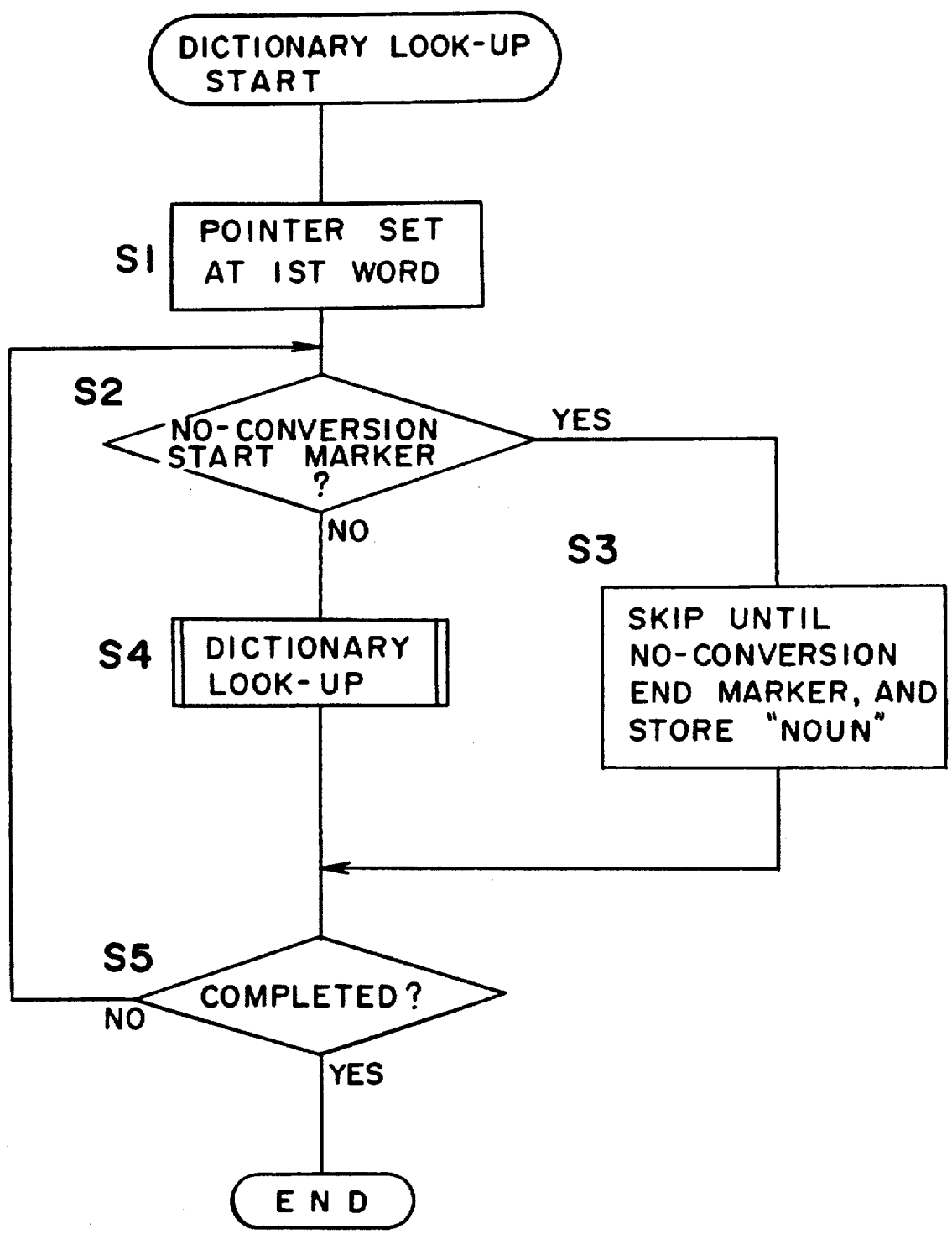
FIG. 11 is a flow chart showing the dictionary referencing operation.

Referring to FIG. 11, at step S1, a pointer which points to the morpheme in the source text to be analyzed by dictionary-referencing morpheme analyzer 11 is set to the first word in the sentence.

At step S2, it is determined whether or not the read data is a no-conversion start marker. If it is determined to be a no-conversion start marker, the procedure advances to step S3; if not, to step S4.

At step S3, dictionary referencing is skipped for all morphemes between the no-conversion start and end markers in the source text, and a flag specifying a "noun compound" is set in the address of buffer B shown in FIG. 4 for the morphemes between said markers. Because setting this flag enables the morphemes between the no-conversion start marker and the no-conversion end marker to be handled as a common noun compound, standard syntactical analysis is sufficient to produce a machine translation.

At step S4, the standard dictionary look-up process is executed, and the obtained part of speech information is then stored in buffer B.

At step S5, it is determined whether dictionary referencing has been completed for all morphemes. If this result shows that dictionary referencing has not been performed for all morphemes, the process returns to step S2; if not, the dictionary referencing process terminates.

In the translation processing operation hereinbefore described, if a no-conversion start marker is read during generation of a correct Japanese sentence by translated sentence generator 14, the translation generation processing is halted until the no-conversion end marker is read. As a result, all morphemes between the no-conversion start marker and no-conversion end marker in the source text are output as they are stated in the source text, and are stored in buffer E in FIG. 4.

The translation generation process of translated sentence generator 14 is described hereinbelow with reference to the flow chart of FIG. 12.

Referring to FIG. 12, at step S11, it is determined whether or not the read data is a no-conversion start marker. If it is determined to be a no-conversion start marker, the procedure advances to step S12; if not, to step S13.

At step S12, translated text generation processing is halted until the no-conversion end marker is read, and all morphemes between the no-conversion start marker and no-conversion end marker are stored at a specified address in buffer E in FIG. 4 as they appear in the source text.

At step S13, the aforementioned standard translated text generation processing is executed by translated sentence generator 14, and a correct translated text is generated and stored in the aforementioned buffer E.

At step S14, it it is determined whether the translated text generation process has been completed. If this result shows that it has not, the process returns to step S11; if it has, the process terminates.

Referring to FIG. 13, an example of the English text input and the Japanese text output from a machine translation apparatus according to a preferred embodiment of the present invention are shown. In this example text, double opening braces "{{" are used as the no-conversion start marker, and double closing braces "}}" are used as the no-conversion end marker.

As thus described, according to a preferred embodiment of the present invention, if in the translation of a source English text to Japanese text there is a part of the sentence which should be output as it appears in the original English text, no-conversion start and end markers are input before and after said parts, respectively, during the text entry process. By this preparation, it is possible to carry out the procedure such that during the dictionary look-up process of dictionary-referencing morpheme analyzer 11, dictionary referencing for the morphemes between the start and end markers is not executed, and a flag identifying the morphemes between the start and end markers as "noun compounds" is stored in buffer B. In the translated text generation process of translated sentence generator 14, because translated text generation processing is not executed for the morphemes between the aforementioned start and end markers and the morphemes between said markers in the source text are output as they appear in the source text and stored in buffer E, that part of the source text specified by the aforementioned no-conversion start marker and no-conversion end marker can be output in the translated text as it appears in the source text without being translated.

According to the aforementioned preferred embodiment of the present invention, two types of markers, a no-conversion start marker and a no-conversion end marker, are used to specify the no-conversion part of the source text, but one type of no-conversion marker only can be used; in such an embodiment, the first no-conversion marker encountered could be the no-conversion start marker and the second no-conversion marker encountered could be the no-conversion end marker.

As will become clear from the description of the present invention hereinbefore provided, the present invention provides a machine translation apparatus having a morpheme analyzer, syntax analyzer, convertor, translated sentence generator. The machine translation apparatus further has: a marker entry means which inputs a no-conversion start marker and a no-conversion end marker specifying that a selected part of the source text be output as it appears in the original; a marker identification means; a skip dictionary referencing data buffer; and a skip text generation data buffer. In the dictionary look-up process, the aforementioned morpheme analyzer halts dictionary referencing when a no-conversion start marker is read until a no-conversion end marker is read, adds a flag identifying the morphemes between said no-conversion start and end markers as a noun compound, and stores said flag and morphemes in a buffer. In the translated text generation process, the aforementioned translated sentence generator halts text generation when the read data is a no-conversion start marker until the no-conversion end marker is read, and stores the morphemes between the aforementioned no-conversion start and end markers in the source language as they appear in the source text in a buffer.

Therefore, according to a preferred embodiment of the present invention, when a selected part of the source text is to be output in the translated text as it appears in the source text, prior deletion of that part from the source text is not necessary, and said selected part can be output as it appears in the source text quickly and correctly in the translated text.

Next, the second embodiment of the present invention will be described in which the translation can be carried out by distinct separated phrases for a long complex sentence.

According to the second embodiment, it is assumed that only the grammatical rules shown in Table 2 are stored in the aforementioned buffer 6.

Table 2

(a) prepositional phrase→preposition + noun phrase
(b) noun phrase→determinative + noun
(c) predicate→verb "to be" + adjective
(d) declarative sentence→noun phrase + predicate
(e) "that" clause→"that" + declarative sentence
(f) sentence→declarative sentence + end punctuation mark
(g) sentence→branch tree + end punctuation mark
(h) branch tree→branch tree + // + branch tree
(i) branch tree→prepositional phrase
(j) branch tree→"that" clause
(k) branch tree→verb "to be"

The grammatical rules in the aforementioned Table 2 express the following.

Specifically, grammatical rule (a) says that a prepositional phrase is composed of a preposition and a noun; rule (b) that a noun phrase is composed of a determinative and a noun; rule (c) that a predicate is composed of the verb "to be" and an adjective; rule (d) that a declarative sentence is composed of a noun phrase and a predicate; rule (e) that a "that" clause is composed of the word "that" and a declarative sentence; rule (f) that a sentence is composed of a declarative sentence and end punctuation mark; rule (g) that a sentence is composed of a branch tree and end punctuation mark; rule (h) that a branch tree is composed of a branch tree and a double slash and a branch tree; rule (i) that a branch tree is composed of a prepositional phrase; rule (j) that a branch tree is composed of a "that" clause; and rule (k) that a branch tree is composed of a verb "be." Of the aforementioned grammatical rules (a) to (k), grammatical rules (g) to (k) include at least one term of "branch tree", and are used for distinct phrase translation processing.

Figure 14:
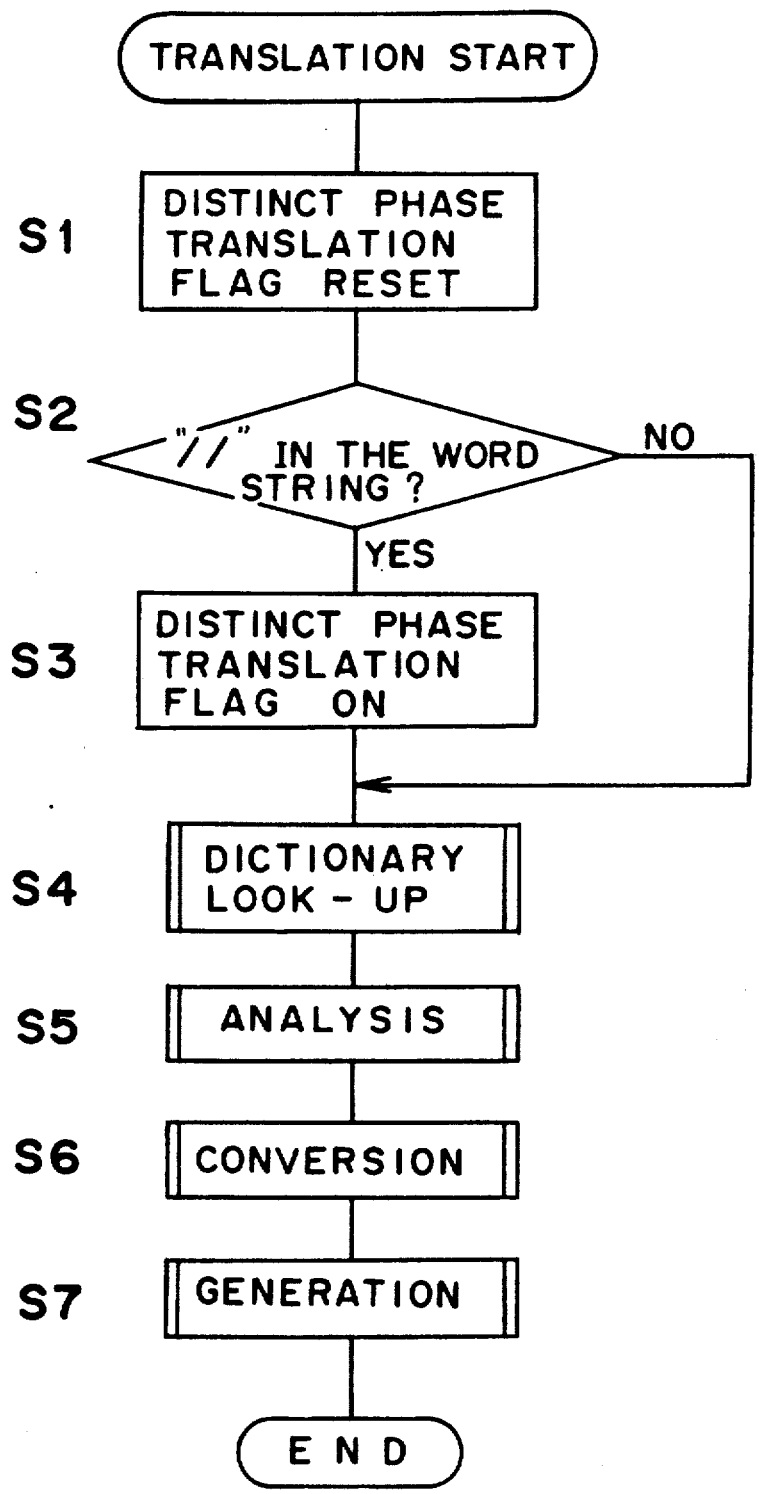
FIG. 14 is a flow chart generally showing a translation operation.

Referring to FIG. 14, a flow chart of the translation process according to the second embodiment is shown. At step S1, a distinct phrase translation flag which indicates execution of the distinct phrase translation process is reset.

At step S2, it is determined whether there is a double slash "//," which is the marker indicating a boundary line for a distinct phrase, in the input word string, or not. If the double slash marker is found, processing passes to step S3; if not, step S3 is skipped.

At step S3, the distinct phrase translation flag becomes ON to indicate execution of distinct phrase translation.

At step S4, the dictionary look-up process of dictionary-referencing morpheme analyzer 11 is executed, part of speech and other grammatical information is obtained, and tense, person, and number are analyzed.

At step S5, syntactical analysis is executed by syntax analyzer 12, and the structural analysis tree is determined.

At step S6, the structure of the structural analysis tree of the source text is converted to the structural analysis tree of the target language.

At step S7, an appropriate translation is generated by translated sentence generator 14.

The syntactical analysis of step S5 above is described in further detail hereinbelow with reference to FIG. 15.

At step S51, the next grammatical rule is read in from the grammatical rules shown in Table 1.

At step S52, it is determined whether the obtained grammatical rule is a distinct phrase translation rule, i.e., is any one of the rules (g), (h), (i), (j) and (k) which contain an item of "branch tree". If it is, processing passes to step S54; if not, to step S53.

At step S53, syntactical analysis occurs using the obtained grammatical rules, and processing is passed to step S56.

At step S54, it is determined whether the aforementioned distinct translation phrase flag is ON. If it is, processing passes to step S55; if not, to step S56.

At step S55, syntactical analysis occurs using the obtained grammatical rules, i.e., the distinct phrase translation rules.

At step S56, it is determined whether there are any word strings in the input word string for which syntactical analysis has not been completed. If there are unprocessed word strings, processing returns to step S51; if not, processing terminates.

The aforementioned translation process is described hereinbelow with reference to a specific input source text. In this example, it is assumed that the source text (a) "Among those advantages is that the instrument is efficient." is entered. Source text (a) is an inverted syntax construction, the syntax normal of which is "That the instrument is efficient is among those advantages."

Figure 15:
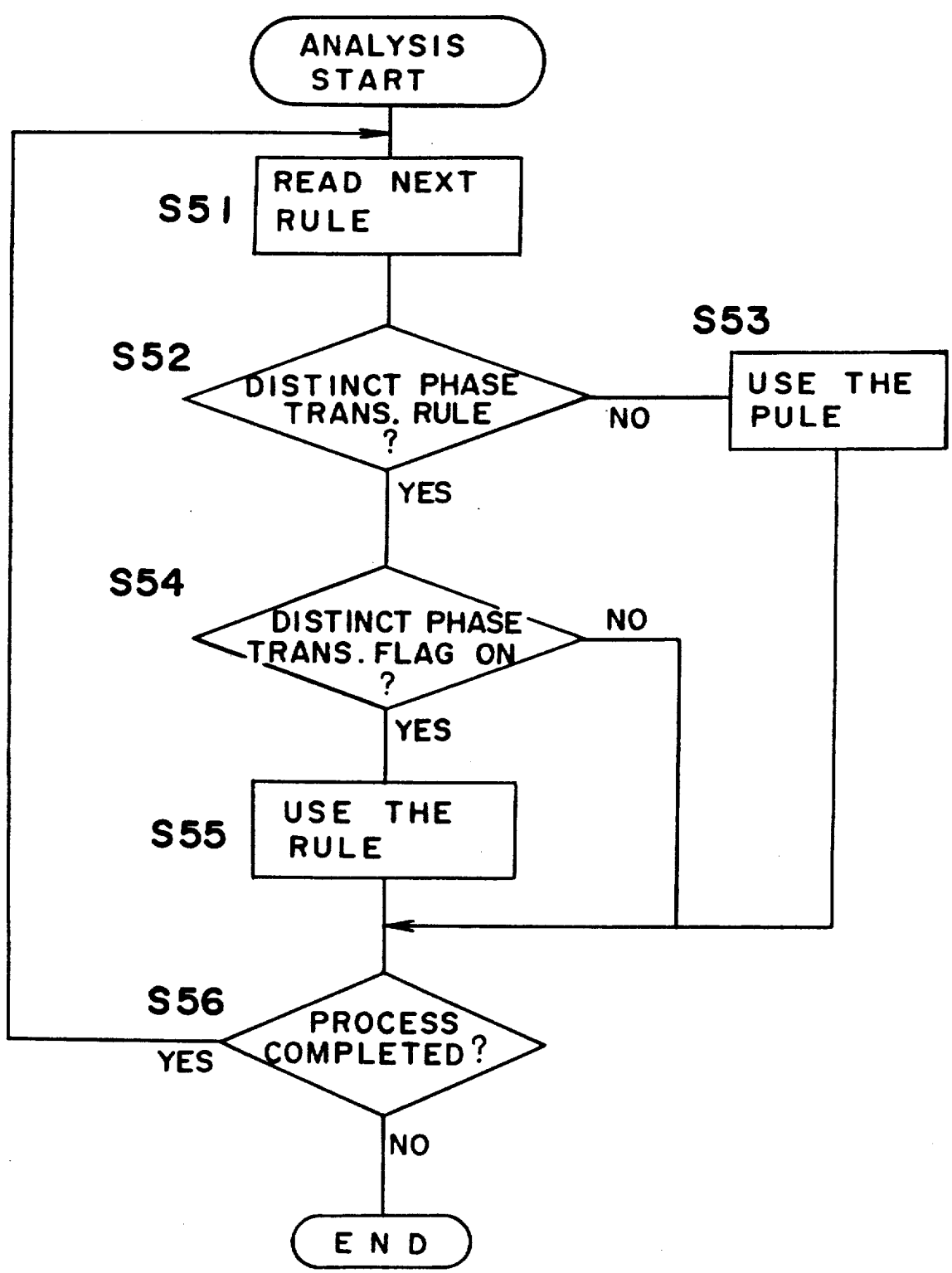
FIG. 15 is a flow chart showing an operation of the analysis shown in FIG. 14.

When source text (a) is entered, processing passes through steps S1, S2, and S4 to S5 in FIG. 14 because there are no double slashes "//" in the entered word string, and analytical processing according to the flow chart in FIG. 15 is executed. However, because grammatical rules able to handle an inverted syntax are not included in the grammatical rules according to the present invention as shown in Table 2, conventional machine translation processing would fail at syntactical analysis.

Therefore, source text (b) "Among those advantages // is // that the instrument is efficient" in which double slashes are inserted in source text (a) is entered from keyboard 4. Thus, because there are double slashes in the entered word string, processing passes through steps S1 and S2 in the flow chart of FIG. 14, and the distinct phrase translation flag is set ON at step S3. Processing therefore passes through step S4 to S5, and syntactical analysis is executed as described below according to the flow chart of FIG. 15.

Figure 16:
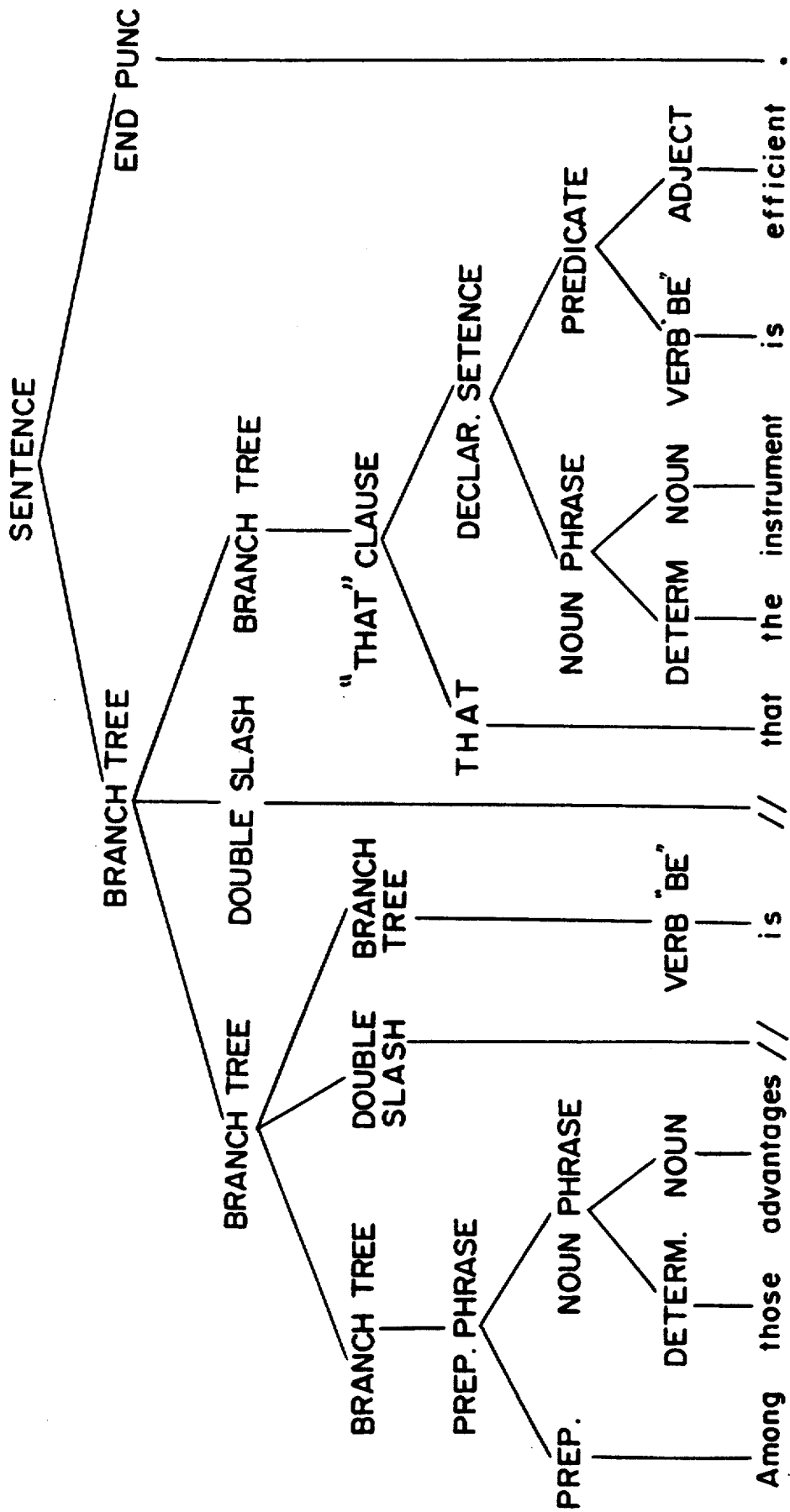
FIG. 16 is a diagram showing a tree structure of the syntax analysis.

In the flow chart of FIG. 15, the grammatical rule at step S51 is read in the following manner. As shown in FIG. 16, since the first word is a preposition, a grammatical rule that begins with a preposition in the right side thereof is selected from the rules stored in buffer 6 as shown in Table 2. Grammatical rule (a) is applicable to this requirement, and thus, rule (a) is selected. Since rule (a) requests a noun phrase added thereto, it is examined in the buffer whether or not the next word is a noun phrase. Since the next word is not a noun phrase, rule (a) is temporarily stored in the buffer without completing the rule.

Then, next grammatical rule that begins with a determinative (representing the second word "those") in the right side thereof is searched. A grammatical rule (b) is applicable to this requirement, and thus rule (b) is selected. Since rule (b) requests a noun added thereto, it is examined in the buffer that the following word is a noun or not. Since the following word is a noun, the rule (b) is satisfied to obtain a fact that the second and third words define a noun phrase.

Then, it is searched in the buffer whether or not there is any request for a noun phrase. Since rule (a) is requesting a noun phrase, the newly obtained noun phrase is added to the stored rule (a) which is then satisfied to produce a prepositional phrase.

Then, a grammatical rule that begins with a prepositional phrase in the right side thereof is searched. A grammatical rule (i) is applicable to this requirement, and thus rule (i) is selected to produce a branch tree, thereby completing a grammatical rule (i).

Then, a grammatical rule that begins with a branch tree is searched. A grammatical rule (h) is applicable to this requirement, and thus rule (h) is selected. Since rule (h) requests a double slash and a branch tree added thereto, it is examined in the buffer that the following word is a double slash or not. Since the following word is a double slash, it is further examined in the buffer that the next following word is a branch tree or not. Since the next word is not the branch tree, rule (h) is temporarily stored in the buffer without completing the rule.

Then, next grammatical rule that begins with a verb "to be" in the right side thereof is searched. A grammatical rule (k) is applicable to this requirement, and thus rule (k) is selected to produce a branch tree.

Then, it is searched in the buffer whether or not there is any request for a branch tree. Since rule (h) is requesting a branch tree, the newly obtained branch tree is added to the stored rule (h) which is then satisfied to produce a branch tree. Since the grammatical rule (h) is a distinct phrase translation rule as hereinbefore described, and since the distinct phrase translation flag has been set ON at step S3 in FIG. 14, processing therefore passes through steps S51, S52, and S54, and at step S55, grammatical rule (h) is used so as to complete the separation of a branch tree, double slash, and branch tree, as shown at the second level of FIG. 16.

In this manner, syntactical analysis is carried out to complete the tree construction of FIG. 16. Based on this structural analysis tree, the distinct translation phrase between the two double slashes is separated from the other phrases, and conversion and generation processing occur. Thus, the distinct translation phrase between the two double slashes is separated from the other phrases and translated, and the output text "SORERA NO RITEN NO AIDA NI // ARU // SONO KIGU GA KORITSU GA TAKAI KOTO" is displayed in Japanese on CRT 3.

As hereinbefore described, long sentences with complex relationships can thus be separated into blocks with double slashes "//" and these blocks can each be translated, it is not necessary to provide special grammatical rules for inverted syntax and other special constructions, and the prospects for grammatical rules overall are improved. Therefore, it is possible to interpret the source text correctly and at high speed. Furthermore, because analysis of special constructions is possible, identification of parts of speech in the entered word string is possible, and it is easier to substitute translations of words.

As will become clear from the description of the present invention hereinbefore provided, because the present invention provides a machine translation apparatus comprising a marker entry means for entering distinct translation phrase markers, a marker identification means for determining whether the distinct translation phrase markers are in the entered word string, and a grammatical rule identification means which determines whether the grammatical rule obtained during the syntactical analysis is a distinct phrase translation rule, and executes syntactical analysis using the distinct phrase translation rule only when distinct translation phrase markers are identified in the input word string.

Accordingly, separation and translation of distinct translation phrases identified by the distinct translation phrase markers are enabled, and thus, fast interpretation of the original is enabled even when the grammatical rules are not applicable to a specific construction or when long sentences with complex relationships are entered.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A machine translation apparatus for inputting source language of words or sentences to be translated to a target language comprising:

a morpheme analyzer having a dictionary for analyzing a source sentence into morphemes and for obtaining part of speech and other information using said dictionary;

a syntax analyzer having grammatical rules for analyzing the structure of the morphemes identified by said morpheme analyzer using said dictionary and grammatical rules;

a converter for converting the structure obtained by said syntax analyzer to a structure of the target language;

a translated sentence generator for generating a translated sentence according to the structure of the target language obtained by said converter;

marker entry means for entering a no-conversion start marker and a no-conversion end marker in said input sentence;

marker identification means for identifying whether or not data read is either one of said no-conversion start marker and said no-conversion end marker;

morpheme skip means for skipping, when said marker identification means identifies the data read to be a no-conversion start marker, the dictionary referencing for all morphemes between the no-conversion start and end markers;

morpheme storing means for storing said morphemes between said no-conversion start and end markers, and adding data identifying said morphemes as a noun compound during dictionary look-up processing of said morpheme analyzer;

generation skip means for skipping translation generation for all morphemes between the no-conversion start and end markers, when said marker identification means identifies the read data to be a no-conversion start marker;

translation generation storing means for storing said morphemes in the same form as they appear in the source language during a translation generation processing in said translated sentence generator; and means for setting a flag as the noun compound in a buffer.

2. The apparatus of claim 1 wherein the means for setting the flag is in an address of the buffer.

* * * * *